(12) United States Patent
Shiohara (10) Patent No.: US 8,786,744 B2
(45) Date of Patent: Jul. 22, 2014

(54) IMAGE-CAPTURING DEVICE, IMAGE-CAPTURING METHOD, AND IMAGE-CAPTURING PROGRAM

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 13/296,685

(22) Filed: Nov. 15, 2011

(65) Prior Publication Data

US 2012/0120291 A1    May 17, 2012

(30) Foreign Application Priority Data

Nov. 15, 2010   (JP) ................................. 2010-254579

(51) Int. Cl.
    *H04N 3/14*         (2006.01)
    *H04N 5/335*      (2011.01)
    *H04N 5/353*      (2011.01)
    *H04N 5/235*      (2006.01)
    *H04N 5/238*      (2006.01)

(52) U.S. Cl.
    CPC ............. *H04N 5/2353* (2013.01); *H04N 5/353* (2013.01); *H04N 5/3532* (2013.01); *H04N 5/238* (2013.01)
    USPC .......................................... 348/296; 348/362

(58) Field of Classification Search
    CPC . H04N 5/2353; H04N 5/3532; H04N 5/3535; H04N 3/1556; H04N 5/35563; H04N 5/35554
    See application file for complete search history.

(56) References Cited

U.S. PATENT DOCUMENTS

| | | | |
|---|---|---|---|
| 6,542,194 B1* | 4/2003 | Juen | 348/367 |
| 7,538,816 B2 | 5/2009 | Harada | |
| 7,630,009 B2 | 12/2009 | Arishima et al. | |
| 7,724,301 B2* | 5/2010 | Alakarhu | 348/362 |
| 7,733,399 B2 | 6/2010 | Totori | |
| 8,063,944 B2* | 11/2011 | Kido | 348/222.1 |
| 8,488,033 B2* | 7/2013 | Takane | 348/296 |
| 8,587,692 B2* | 11/2013 | Lee et al. | 348/229.1 |
| 2006/0087573 A1* | 4/2006 | Harada | 348/294 |
| 2008/0002043 A1* | 1/2008 | Inoue et al. | 348/296 |
| 2008/0044170 A1* | 2/2008 | Yap et al. | 396/52 |
| 2008/0309806 A1* | 12/2008 | Arishima et al. | 348/294 |
| 2009/0015704 A1* | 1/2009 | Namai et al. | 348/340 |

(Continued)

FOREIGN PATENT DOCUMENTS

| | | |
|---|---|---|
| JP | 11-041523 A | 2/1999 |
| JP | 2000-152057 A | 5/2000 |

(Continued)

*Primary Examiner* — Twylers Haskins
*Assistant Examiner* — Wesley J Chiu
(74) *Attorney, Agent, or Firm* — Global IP Counselors, LLP (57) ABSTRACT

An electronic shutter control part is configured to control an electronic shutter. A mechanical shutter has a light-shielding part. The mechanical shutter is configured to end exposing the first and second photoelectric conversion elements by moving the light-shielding part. The assessing part is configured to assess whether the length of a exposure time is longer or less than a threshold value. The electronic shutter control part is configured to control the electronic shutter to start exposing the first photoelectric conversion element at a first exposure-start timing and control the electronic shutter to start exposing the second photoelectric conversion element at a second exposure-start timing in order to make the first exposure time to be closer to the second exposure time when the exposure time is less than a threshold value, than when the exposure time is longer than a threshold value.

15 Claims, 5 Drawing Sheets

(56) References Cited

U.S. PATENT DOCUMENTS

| | | | |
|---|---|---|---|
| 2009/0167911 A1* | 7/2009 | Takane | 348/296 |
| 2009/0213233 A1* | 8/2009 | Kido | 348/208.4 |
| 2010/0045852 A1* | 2/2010 | Tanaka et al. | 348/362 |
| 2010/0329657 A1* | 12/2010 | Hosoi et al. | 396/169 |
| 2011/0019070 A1* | 1/2011 | Moon | 348/362 |
| 2012/0069214 A1* | 3/2012 | Shiohara | 348/229.1 |
| 2012/0147201 A1* | 6/2012 | Asukabe | 348/208.1 |
| 2013/0155301 A1* | 6/2013 | Takahashi | 348/296 |
| 2014/0049664 A1* | 2/2014 | LEE et al. | 348/229.1 |

FOREIGN PATENT DOCUMENTS

| | | | |
|---|---|---|---|
| JP | 2006-101492 A | | 4/2006 |
| JP | 2007-159061 A | | 6/2007 |
| JP | 2008-035106 A | | 2/2008 |
| JP | 2008-067234 A | | 3/2008 |
| JP | 2008-147979 A | | 6/2008 |
| JP | 2008147979 A | * | 6/2008 |
| JP | 2008-299089 A | | 12/2008 |
| JP | 2008-312170 A | | 12/2008 |
| JP | 2009-089330 A | | 4/2009 |
| JP | 2009-141804 A | | 6/2009 |

* cited by examiner

IMAGE-CAPTURING DEVICE, IMAGE-CAPTURING METHOD, AND IMAGE-CAPTURING PROGRAM

CROSS-REFERENCE TO RELATED APPLICATIONS

This application claims priority to Japanese Patent Application No. 2010-254579 filed on Nov. 15, 2010. The entire disclosure of Japanese Patent Application No. 2010-254579 is hereby incorporated herein by reference.

BACKGROUND

1. Technological Field

The present invention relates to a technique for controlling an exposure time using an electronic shutter and a mechanical shutter and capturing an image.

2. Background Technology

There have been proposed image-capturing devices in which an electronic shutter controls a timing at which exposure in a plurality of photoelectric conversion elements is started and a mechanical shutter controls a timing at which exposure is ended (see Patent Citations 1 through 3). In an image-capturing device of such description, the electronic shutter controls the timing at which exposure is started in a manner that is reliant on the timing at which the mechanical shutter causes exposure to end, whereby the exposure time for each of the photoelectric conversion elements is made more uniform.

Japanese Laid-open Patent Publication Nos. 11-41523 (Patent Citation 1), 2006-101492 (Patent Citation 2), and 2008-147979 (Patent Citation 3) are examples of the related art.

SUMMARY

Problems to be Solved by the Invention

However, the timing at which the mechanical shutter causes exposure to end is dependent on the motion of a light-shielding screen, and has non-linear characteristics. Therefore, it is difficult for the electronic shutter to control the timing at which exposure is started in a manner that is completely reliant on the timing at which the mechanical shutter causes exposure to end. Specifically, the electronic shutter must be made to operate at a timing that has non-linear characteristics, and a problem is presented with regards to increased processing load on a circuit for controlling the electronic shutter, which operates at a high speed. With the above-mentioned problem in view, an advantage of the invention is to reduce the load of controlling the electronic shutter.

Means Used to Solve the Above-Mentioned Problems

An image-capturing device includes an electronic shutter control part, a mechanical shutter, and an assessing part. The electronic shutter control part is configured to control an electronic shutter and to start exposing first and second photoelectric conversion elements and accumulating electrical charge on the first and second photoelectric conversion element on the basis of the light. The mechanical shutter has a light-shielding part which is configured to be able to shield the first and second photoelectric conversion elements from the light, the mechanical shutter being configured to end exposing the first and second photoelectric conversion elements by moving the light-shielding part. The assessing part is configured to assess whether the length of a exposure time is longer or less than a threshold value. The electronic shutter control part is configured to control the electronic shutter to start exposing the first photoelectric conversion element at a first exposure-start timing and control the electronic shutter to start exposing the second photoelectric conversion element at a second exposure-start timing in order to make the first exposure time to be closer to the second exposure time when the exposure time is less than a threshold value, than when the exposure time is longer than a threshold value.

BRIEF DESCRIPTION OF THE DRAWINGS

Referring now to the attached drawings which form a part of this original disclosure.

DETAILED DESCRIPTION OF EXEMPLARY EMBODIMENTS

Embodiment of the invention will now be described, in the sequence listed below, with reference to the accompanying drawings. Constituent elements that correspond between drawings are affixed with identical numerals, and a duplicate description will not be given.
(1) Configuration of image-capturing device
(2) Control of electronic shutter
　(2-1) Non-reliant operation (global shutter operation)
　(2-2) Reliant operation (rolling shutter operation)
(3) First modification example
(4) Second modification example
(5) Third modification example

(1) Configuration of Image-Capturing Device

Figure 1:
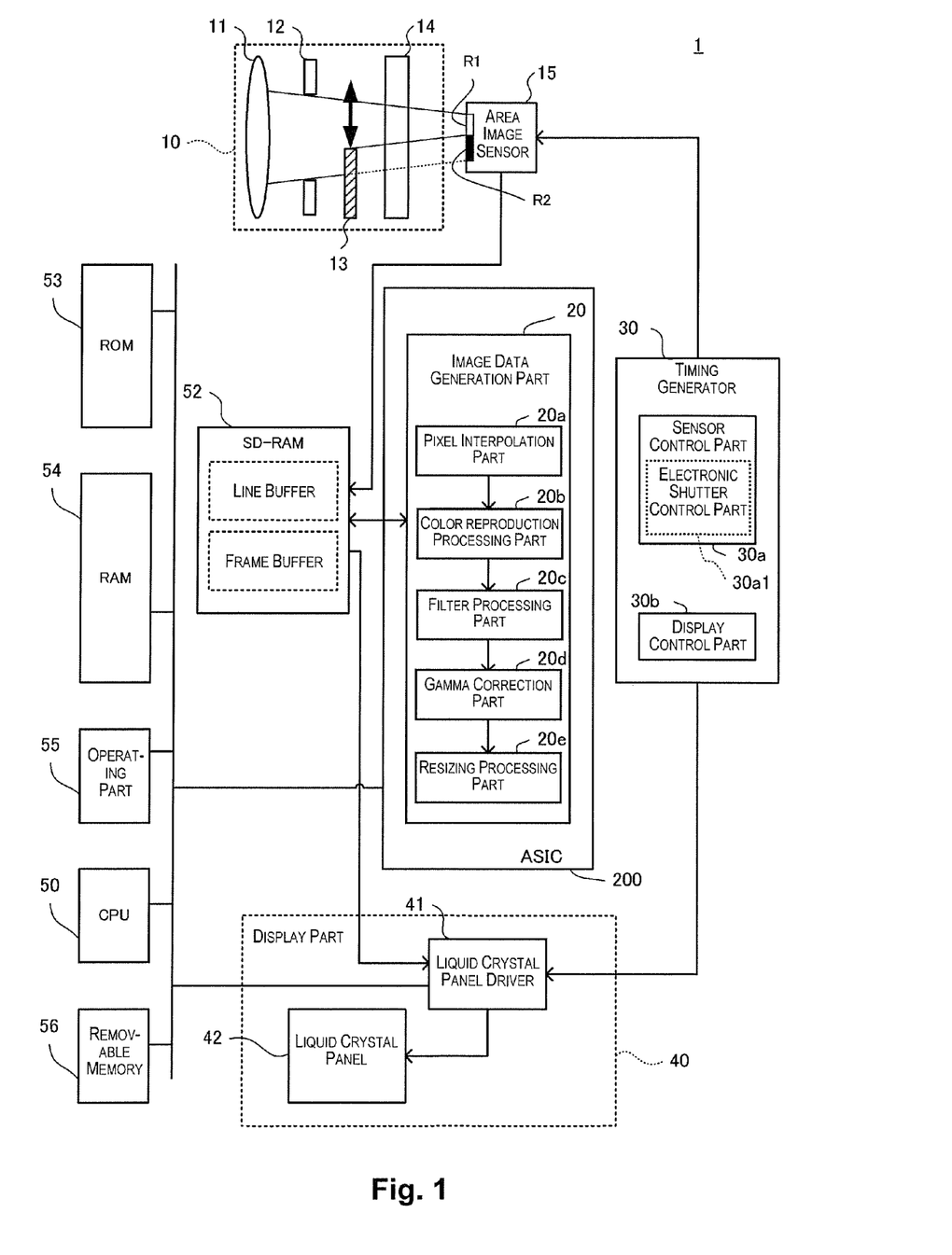
FIG. 1 is a block diagram showing a digital camera.

FIG. 1 is a block diagram of an image-capturing device 1 according to an embodiment of the invention. The image-capturing device 1 according to the invention is a mirrorless digital camera including an electronic view finder (EVF). The image-capturing device 1 includes an optical system 10, an area image sensor 15, an ASIC 200, a timing generator 30, a display part 40, a CPU 50, an SD-RAM 52, a ROM 53, a RAM 54, an operating part 55, and a removable memory 56. The CPU 50 uses the SD-RAM 52 and the RAM 54 as appropriate and executes a program recorded in the ROM 53 (non-transitory computer medium). Using the function of the program, the CPU 50 performs a function of generating an image data representing a subject captured by the area image sensor 15 in accordance with an operation performed on the operating part 55. The operating part 55 includes a shutter button, and a dial switch for setting the exposure time (shutter speed) or the maximum aperture or the exposure value of an aperture 12.

The optical system 10 includes a lens 11, the aperture 12, a mechanical shutter 13, and a low-pass filter 14. The lens 11 collects captured light and causes an image of the subject to form on the area image sensor 15. The lens 11 and the aperture 12 are provided on an exchangeable-type lens unit, and the exchangeable-type lens unit is mounted in an exchangeable manner on a housing of the image-capturing device 1. The low-pass filter 14 blocks spatial high-frequency components in the captured light within the area image sensor 15, and prevents moiré in the captured image. The aperture 12 narrows the column of captured light.

Figure 2A:
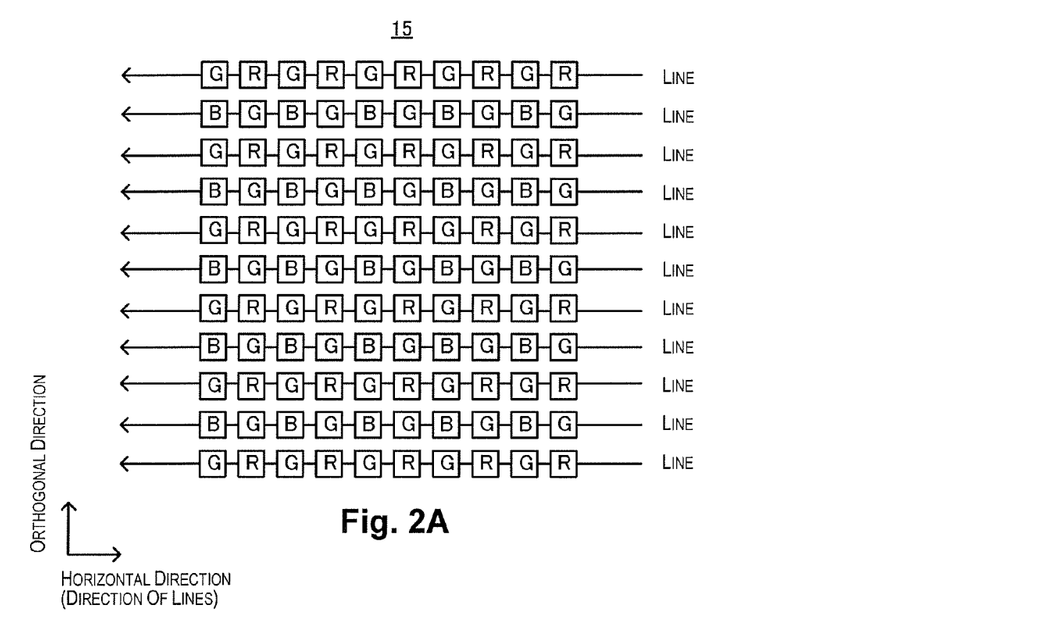
FIG. 2 is a schematic diagram of an area image sensor.

FIG. 2A is a schematic diagram showing a part of an element surface of the area image sensor 15 as viewed from the front. The area image sensor 15 is a complementary metal oxide semiconductor (CMOS), a charge-coupled device (CCD), or another solid image pickup element in which, e.g., a color filter arranged in a Bayer arrangement and a plurality of photoelectric conversion elements for accumulating electrical load corresponding to exposure amount are arranged on a predetermined element surface. In the present embodiment, a description will be given using an example of an instance in which a CMOS image sensor is used. In FIG. 2A, each of the photoelectric conversion elements is represented by a square, and the color (3 channels: red (R), green (G), and blue (B)) of a color filter provided to the corresponding photoelectric conversion element is shown inside the square. The positions of arrangement of the photoelectric conversion elements on the element surface of the area image sensor 15 are defined by rectangular coordinates. A line is formed by a plurality of photoelectric conversion elements aligned in a direction parallel to one of the coordinate axes, and a plurality of lines are arranged so as to be aligned in a direction parallel to the other coordinate axis. In the specification, the direction parallel to the line is referred to as a horizontal direction, and the direction orthogonal to the line is referred to as an orthogonal direction.

In the area image sensor 15 according to the present embodiment, resetting (discharging) of an electrical charge accumulated in the photoelectric conversion elements can be performed in units of lines. In other words, with regards to the photoelectric conversion elements belonging to a same line, the electrical charge is reset simultaneously with respect to each other, and accumulation of electrical charge is started simultaneously with respect to each other. The start of accumulation of electrical charge in the photoelectric conversion elements signifies a start of exposure in the photoelectric conversion elements. For example, each of the photoelectric conversion elements includes a reset field effect transistor for discharging electrical charge by conduction between a source and a drain, and wiring for applying a voltage to a gate of the reset field effect transistor is shared between each of the photoelectric conversion elements belonging to a same line. The area image sensor 15 reads the electrical charge accumulated in the photoelectric conversion elements in units of lines. The area image sensor 15 can perform the reading in an intermittent manner, instead of reading from every line, according to the necessary image quality or speed. The electrical charge in the photoelectric conversion element is also reset in an instance in which the electrical charge has been read. The area image sensor 15 performs, using an A/D converter or another device, an A/D conversion on the gradation value of the exposure amount corresponding to the electrical charge that has been read, and generates image pickup data corresponding to each pixel. This image pickup data corresponds to the image of the invention. Each pixel in the image pickup data corresponds uniquely to each photoelectric conversion element. The image pickup data read from the area image sensor 15 is buffered in the SD-RAM 52. The ASIC 200, which is described further below, performs a variety of types of image processing on the image pickup data.

Figure 2B:
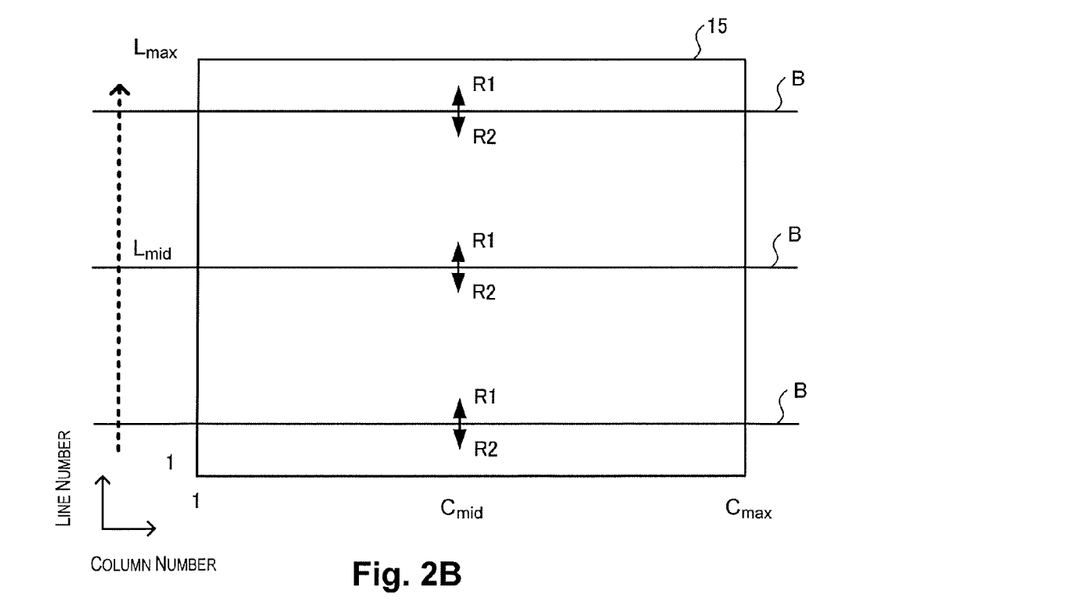

FIG. 2B is a schematic diagram showing the entire element surface of the area image sensor 15 as viewed from the front. Each of the lines is affixed with a line number (1 through $L_{max}$), which increases in increments of 1 with each line upwards in the orthogonal direction, and each column in the orthogonal direction, which is perpendicular to the lines, is affixed with a column number C (1 through $C_{max}$), which increases in increments of 1 with each column to the right in the horizontal direction. The line number L of a line at a center in the orthogonal direction is referred to as $L_{mid}$, and the column number C of a column at a center in the horizontal direction is referred to as $C_{mid}$. The mechanical shutter 13 includes a light-shielding screen (shown as a hatching in FIG. 1), which is a flat plate-shaped light-shielding part substantially parallel to the element surface of the area image sensor 15 on which the photoelectric conversion elements are arranged. The light-shielding screen forms an exposure region R1 and a light-shielded region R2 on the element surface of the area image sensor 15 on which the photoelectric conversion elements are arranged. Specifically, a shadow of the light-shielding screen on the element surface of the area image sensor 15 corresponds to the light-shielded region R2. The mechanical shutter 13 operates the light-shielding screen as follows.

The mechanical shutter 13 according to the present embodiment is a "normal open" type. When the power of the image-capturing device 1 is in an OFF state, the light-shielding screen is locked by a locking lever and attachedly held by a permanent magnet. The light-shielding screen is locked by the locking lever and attached by the permanent magnet, and thereby locked to an outside of a light path of the captured light, in resistance against a spring force from a spring that works to pull the light-shielding screen to a position at which the light-shielding screen blocks the whole of the captured light. When the power of the image-capturing device 1 is in an ON state, the locking of the light-shielding screen by the locking lever is disengaged. Even when the locking of the light-shielding screen by the locking lever has been disengaged, the light-shielding screen is attachedly held by the permanent magnet, and the light-shielding screen continues to be held in resistance against the spring force. When the shutter button is pressed, an electronic shutter control part 30*a*1 starts exposure in each of the photoelectric conversion elements. When a period corresponding to the exposure time has elapsed since the start of exposure, an electric current is fed to an electromagnet for generating a magnetic force, which cancels out the magnetic force from the permanent magnet for attaching the light-shielding screen; and the attaching and holding of the light-shielding screen by the permanent magnet is disengaged. The light-shielding screen is thereby moved by the spring force, and the light-shielding screen moves to a position at which it blocks the whole of the captured light.

FIG. 2B schematically shows the circumstances in which the mechanical shutter 13 uses the spring force to move the light-shielding screen, where a boundary B between the exposure region R1 and the light-shielded region R2 moves on the element surface of the area image sensor 15. In the present embodiment, the electromagnet pulls the light-shielding screen downwards, and the spring pulls the light-shielding screen upwards, where the boundary B between the exposure region R1 and the light-shielded region R2 moves (in the direction shown by the dashed arrow) upwards from below when the shutter closes. The light-shielding screen moves in parallel upwards from below, and the boundary B between the exposure region R1 and the light-shielded region R2 moves while remaining parallel to the direction of each of the lines. The movement of the light-shielding screen causes the boundary B to reach the photoelectric conversion elements, and exposure in the photoelectric conversion elements is thereby ended. Since the boundary B between the exposure region R1 and the light-shielded region R2 is parallel to the direction of each of the lines, exposure in each of the photoelectric conversion elements belonging to the same line is ended simultaneously.

The timing generator 30 includes a sensor control part 30a and a display control part 30b, and the sensor control part 30a includes the electronic shutter control part 30a1. The sensor control part 30a generates a signal for controlling a variety of operation timings for each of the photoelectric conversion elements on a liquid crystal panel 42, and outputs the signal to the area image sensor 15. The display control part 30b generates a signal for controlling the display timing for each of the display pixels on the liquid crystal panel 42, and outputs the signal to a liquid crystal panel driver 41.

The electronic shutter control part 30a1 opens the electronic shutter when the shutter button is pressed on the operating part 55. "Opening the electronic shutter" refers to resetting the electrical charge, restarting the accumulation of electrical charge, and starting exposure, in all of the photoelectric conversion elements of the area image sensor 15. As described above, in the present embodiment, the electrical charge accumulated in the photoelectric conversion elements can be reset in units of lines. An operation is performed in which resetting of the electrical charge and accumulation of the electrical charge is performed in sequence with respect to every line (i.e., a rolling shutter operation), thereby starting accumulation in all of the photoelectric conversion elements. The electronic shutter control part 30a1 can also reset the electrical charge in all of the lines simultaneously, and then start accumulation of the electrical charge in sequence in units of lines, and thereby perform the rolling shutter operation. In either instance, in the rolling shutter operation, the timing at which exposure of the photoelectric conversion elements starts varies between each line.

The display part 40 is an EVF. The display part 40 displays a "live-view" moving image, which is generated by reading (using intermittent reading) the data representing the exposure amount detected by each of the photoelectric conversion elements of the area image sensor 15 and also displays a still image of the captured subject. The display part 40 includes an interface circuit (not shown), the liquid crystal panel driver 41, the liquid crystal panel 42, and an eyepiece lens and other components (not shown). The liquid crystal panel driver 41 outputs, to the liquid crystal panel 42, a signal for applying a voltage to each subpixel and driving liquid crystal.

The ASIC 200 includes an image-data-generating part 20. The image-data-generating part 20 uses a line buffer or a frame buffer provided in advance in the SD-RAM 52, and performs a variety of types of image processing on the image pickup data captured by the area image sensor 15 by using pipeline processing. The ASIC 200 can also be an image-processing digital signal processor (DSP). The image-data-generating part 20 includes a pixel interpolation part 20a, a color reproduction processing part 20b, a filter processing part 20c, a gamma correction part 20d, and a resizing processing part 20e.

The image-data-generating part 20 obtains the image pickup data captured by the area image sensor 15. The pixel interpolation part 20a performs an interpolation process using the gradation values of surrounding pixels to calculate gradation values for two color channels which differ from the color of the color filter provided to the photoelectric conversion element corresponding to each of the pixels. As a result, image pickup data, in which gradation values in three channels are made to correspond to each pixel, is generated. The color reproduction processing part 20b performs a matrix operation with regards to the gradation values for each of the pixels in the image pickup data on which pixel interpolation has been completed, and thereby performs color conversion processing for color matching. The filter processing part 20c performs sharpness adjustment, noise removal processing, and similar processes on the image pickup data using filter processing. The gamma correction part 20d performs gamma correction for compensating for the difference in characteristics between the color indicated by the gradation value in captured data from the area image sensor 15 and the color indicated by the gradation values in the image data handled by the display part 40 and other components. The resizing processing part 20e sequentially references data recorded in the line buffer, performs interpolation computation processing, specifies a gradation value for each of the channels at positions between pixels, and thereby performs resizing to, e.g., a size for recording. When resizing is completed in the resizing processing part 20e, it is possible to generate an image data on which each type of image processing in the image-data-generating part 20 has been completed. This image data is buffered in the SD-RAM 52, and displayed on the display part 40 as well as recorded in the removable memory 56.

(2) Control of Electronic Shutter

The CPU 50 obtains an exposure time TE, which has been set using a mode dial, a calculation by the CPU 50 according to an automatic setting function, or another method and assesses whether or not the exposure time is less than a predetermined threshold value TH. The CPU 50 constitutes an assessing part. The electronic shutter control part 30a1 performs a reliant operation (rolling shutter operation) in an instance in which the exposure time TE that has been set is less than the threshold value TH, and performs a non-reliant operation (global shutter operation) in an instance in which the exposure time TE that has been set is equal to or greater than the threshold value TH. Details of the reliant operation and the non-reliant operation will now be described.

(2-1) Non-Reliant Operation (Global Shutter Operation)

Figure 3:
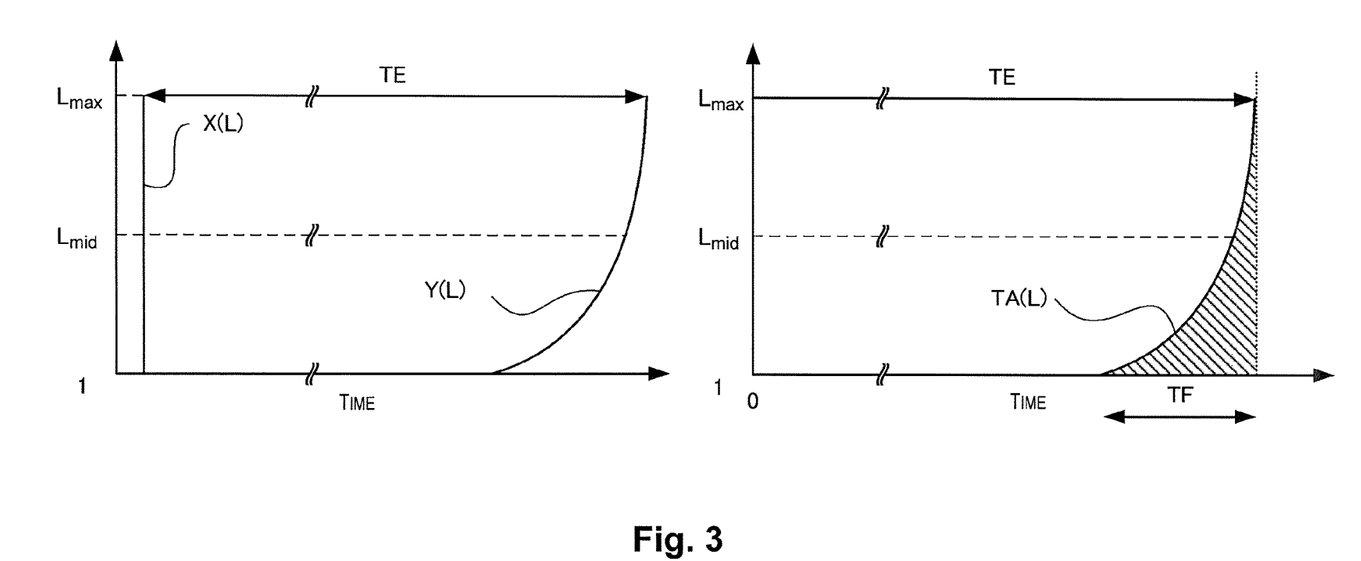
FIG. 3 is a graph showing exposure timings during a non-reliant operation.

The left graph of FIG. 3 is a graph showing exposure timings in an instance in which the non-reliant operation is performed. In the left graph of FIG. 3, the horizontal axis represents points in time and the vertical axis represents the line number L. The straight line on the left side of the left graph of FIG. 3 represents a timing at which exposure starts in relation to the photoelectric conversion elements in each of the lines in the area image sensor 15, and the timing (point in time) is given by a function X(L) of the line number L. In the non-reliant operation, this timing X(L) is a constant that does not depend on the line number L. The curve on the right side of the left graph of FIG. 3 represents a timing at which exposure is ended, and the timing (time) is given by a function Y(L) of the line number L. The variable (L) in each of the functions can be hereafter omitted in instances such as that in which there is no need to indicate a specific line number L.

A period $\{Y(L_{max})-Y(1)\}$, between a timing Y(1) at which exposure is ended in the photoelectric conversion elements belonging to the lowermost line and a timing $Y(L_{max})$ at which exposure is ended in the photoelectric conversion elements belonging to the uppermost line, is referred to as a maximum error period TF. The right graph of FIG. 3 shows the actual exposure time TA(L) in each of the photoelectric conversion elements. In the right graph of FIG. 3, the horizontal axis represents time and the vertical axis represents the line number L. The actual exposure time TA(L) in each of the photoelectric conversion elements is a period between when the electronic shutter starts exposure and when the mechanical shutter 13 ends exposure. A difference {Y(L)–X(L)} between a timing X and the timing Y in the direction of the horizontal axis of the left graph of FIG. 3 corresponds to the actual exposure time TA(L) of the photoelectric conversion elements shown in the right graph of FIG. 3.

The light-shielding screen of the mechanical shutter 13 operates under the effect of the spring force, a friction force, and other forces. However, for purposes of simplicity, a description will be given under an assumption that the mechanical shutter 13 is caused by the spring force to undergo a constant acceleration motion. In such an instance, the position of the boundary B between the exposure region R1 and the light-shielded region R2 in the orthogonal direction gradually progresses in a shape of a parabola whose gradient gradually increases. Therefore, as shown by the timing Y, the line number of a line at which exposure of the photoelectric conversion elements is ended gradually increases parabolically with passage of time. Specifically, the timing Y is an inverse of a quadratic function.

In the non-reliant operation, the electrical charge is reset and the electrical charge accumulation is started in relation to all photoelectric conversion elements belonging to all lines simultaneously as shown in the left graph in FIG. 3, and exposure is started in all photoelectric conversion elements simultaneously. Specifically, as shown in the left graph of FIG. 3, the timing X at which exposure starts is linear. Therefore, there is a low degree of reliance with respect to the parabola-shaped timing Y at which exposure is ended. In an instance in which non-reliant operation is performed, the timing X corresponds to a second exposure-start timing. The mechanical shutter 13 is made to operate so as to end exposure at the lowermost line after standing by for a period, which is obtained by subtracting the maximum error period TF from the exposure time TE that has been set, since exposure in all of the photoelectric conversion elements has been started simultaneously. The actual exposure time $TA(L_{max})$ of the photoelectric conversion elements in the uppermost line (line number $L_{max}$) and the exposure time TE that has been set thereby match as shown in the right graph of FIG. 3. With regards to lines further below, for which the end of exposure arrives earlier than for the uppermost line, the actual exposure time TA(L) is less than the exposure time TE that has been set, and an error (shown by hatching) is generated between the actual exposure time TA(L) and the exposure time TE that has been set. The error between the actual exposure time TA(1) in the photoelectric conversion elements in the lowermost line (line number 1) and the exposure time TE that has been set is the largest. The size of this error is equal to the maximum error period TF between when the mechanical shutter 13 causes exposure to end in the lowermost line and when the mechanical shutter 13 causes exposure to end in the uppermost line. Even if there is a change in the exposure time TE that has been set, the light-shielding screen is caused by the spring force to undergo a similar motion. Therefore, the maximum error period TF, which is the maximum error of the actual exposure time TA(L), is fixed and is not dependent on the exposure time TE that has been set. After exposure has ended, a state is maintained in which the mechanical shutter 13 is shielding light, while electrical charge accumulated in each of the photoelectric conversion elements of the area image sensor 15 are read, and image pickup data is generated. The image-data-generating part 20 then generates image data from the image pickup data.

Here, a unit amount of light received by a photoelectric conversion element per unit time, in an instance in which a stationary and uniform subject is captured under a fixed environment during the exposure time TE that has been set, is represented by ΔE. In such an instance, a standard exposure amount ES of light that should theoretically be received by every photoelectric conversion element is ΔE×TE. As described above, the actual exposure time $TA(L_{max})$ for the photoelectric conversion elements in the uppermost line (line number $L_{max}$) is equal to the exposure time TE that has been set. Therefore, an exposure amount $EE(L_{max})$ of light received by a photoelectric conversion element in the uppermost line is equal to the standard exposure amount ES. Meanwhile, the actual exposure time TA(1) in the photoelectric conversion elements in the lowermost line (line number 1) is a time obtained by subtracting the maximum error period TF from the exposure time TE that has been set. Therefore, an exposure amount EE(1) of light received by a photoelectric conversion element in the lowermost line is represented by ΔE×(TE−TF), which is smaller than the standard exposure amount ES by an error ΔE×TF. An error ratio ER, which is a ratio of the error ΔE×TF relative to the ES, is (ΔE×TF)/(ΔE×TE)=TF/TE. A smaller error ratio ER signifies, even in an instance in which the maximum error period TF is generated in the actual exposure time TA (1) of the photoelectric conversion elements in the lowermost line, a smaller contribution of the error ΔE×TF caused by the maximum error period TF with respect to the standard exposure amount ES; and unevenness in the light intensity in the image, caused by the error ΔE×TF, being less apparent to a viewer. In the present embodiment, a predetermined threshold value th is set to the error ratio ER, and an exposure time TE=TF/th, which satisfies th=TF/TE is set as a threshold value TH of the exposure time TE. For example, the threshold value th is set to 3%, and a threshold value TH of the exposure time TE that corresponds to the threshold value th is set. Causing the global shutter operation to only be performed in an instance in which the exposure time TE is equal to or greater than the threshold value TH makes it possible to guarantee that the in-plane error of light intensity in the image, in an instance in which a uniform subject is captured using global shutter operation under a fixed environment, is 3% or less. Since the perception of unevenness in the light intensity varies between viewers, the threshold value th (TH) can also be set by an operation performed on the operating part 55. Also, since the degree of tolerance that can be applied to unevenness in the light intensity varies according to the subject or usage of the captured image, the threshold value th (TH) can be set according to the image-capturing mode, image-capturing scene, or other factors.

Meanwhile, if the global shutter operation is performed in an instance in which the exposure time TE is less than the threshold value TH, the in-plane error of the light intensity in the image can exceed 3%. Therefore, the reliant operation is to be performed in an instance in which the exposure time TE that has been set is less than the threshold value TH. In the reliant operation, in order to make the actual exposure time TA(L) for the photoelectric conversion elements belonging to each of the lines more uniform, the timing X for the electronic shutter has a shape of a broken line that is reliant on the timing Y for the mechanical shutter 13.

(2-2) Reliant Operation (Rolling Shutter Operation)

Figure 4:
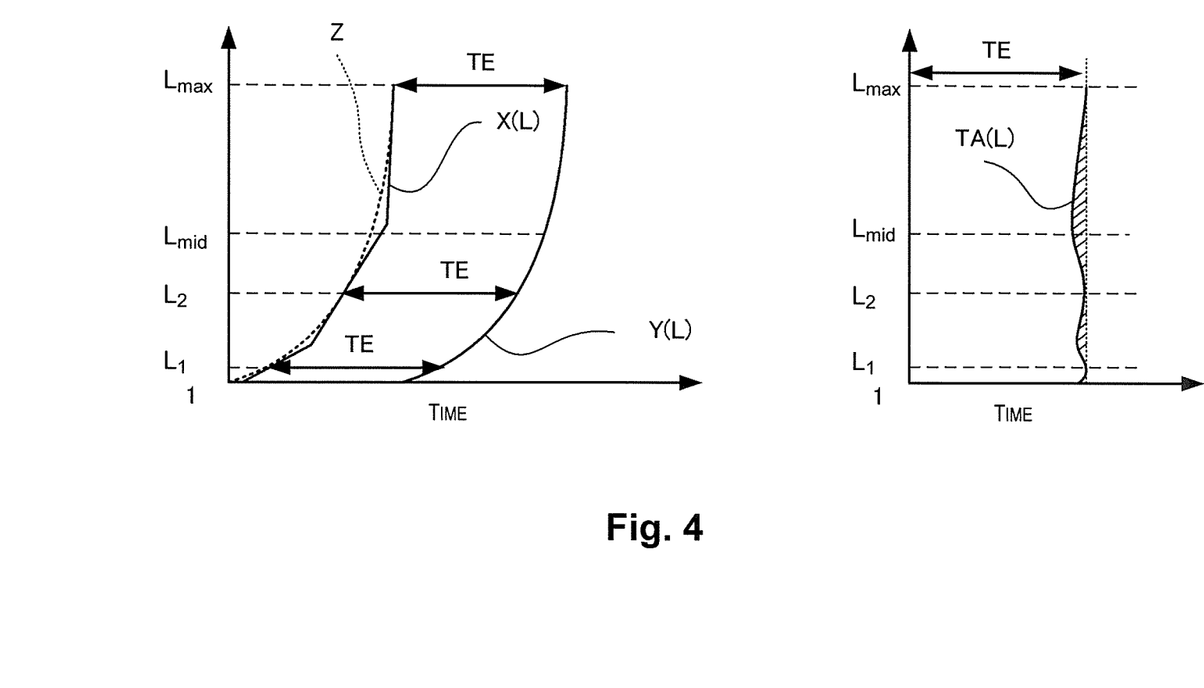
FIG. 4 is a graph showing exposure timings during a reliant operation.

The left graph of FIG. 4 is a graph showing exposure timings in an instance in which the reliant operation is performed. In the left graph of FIG. 4, the horizontal axis represents points in time and the vertical axis represents the line number L. The timing X for the electronic shutter in the reliant operation is set as follows. First, the timing Y(L) at which the boundary B reaches each of the lines is specified based on an equation of motion of the light-shielding screen, or actual measurements. Then, an offset curve Z (shown by a dashed line) is created, the offset curve Z being obtained by offsetting the timing Y(L), towards a direction representing earlier points in time, by the exposure time TE that has been set. Next, tangents to the offset curve Z at line numbers $L_1, L_2,$ and $L_{max}$ respectively are created, where $1 < L_1 < L_2 < L_{max}$. Then, a three-stage broken line, whose bending points are an intersection of two of the tangents to the offset curve Z at line numbers $L_1, L_2$ respectively and an intersection of two of the tangents to the offset curve Z at line numbers $L_2$ and $L_{max}$, is created. This three-stage broken line represents the timing X for the electronic shutter. The timing X of the electronic shutter is reliant on a parabola whose gradient gradually increases. Therefore, the gradient of the broken line in the first stage is smaller than that of the broken line in the second stage, and the gradient of the broken line in the second stage is smaller than that of the broken line in the third stage. The number of stages of the broken line is not limited to three stages; it can be one stage (i.e., a straight line), two stages, or four or more stages.

The electronic shutter control part 30*a*1 performs a rolling shutter operation, in which exposure is started in the photoelectric conversion elements in ascending order of the line number, wherein the interval between the timings at which exposure is started in adjacent lines is of a length corresponding to the gradient of the timing X of the three-stage broken line. Specifically, the interval between the timings at which exposure is started in adjacent lines having line numbers that correspond to the broken line in the $n^{th}$ stage (where n is a natural number equal to or less than 3) is uniform and is set to be longer than the interval between the timings at which exposure is started in lines having adjacent line numbers that correspond to the broken line in the $(n+1)^{th}$ stage. When the shutter button is pressed, the electronic shutter control part 30*a*1 first starts accumulation of electrical charge in the photoelectric conversion elements from the lowermost line. After standing by for a predetermined period from the start timing, the mechanical shutter 13 feeds an electrical current to the electromagnet and causes the attaching of the light-shielding screen by the permanent magnet to disengage, and causes the spring force to move the light-shielding screen. The predetermined period is a period that is substantially equal to the exposure time TE that has been set; and is one in which the actual exposure time $TA(L, C_{mid})$ of each photoelectric conversion element belonging to the column at the center in the horizontal direction (column number $C_{mid}$), from amongst the photoelectric conversion elements in lines having line numbers $L_1, L_2, L_{max}$, is equal to the exposure time TE that has been set. After exposure has ended, a state is maintained in which the mechanical shutter 13 is shielding light, while electrical charge accumulated in each of the photoelectric conversion elements of the area image sensor 15 are read, and image pickup data is generated. The image-data-generating part 20 then generates image data from the image pickup data.

Thus, the electronic shutter control part 30*a*1 controls the timing at which exposure is to be started in the photoelectric conversion elements belonging to each of the lines, in a manner that is reliant on the timing $Y(L, C_{mid})$ for the mechanical shutter 13, whereby the actual exposure time TA(L) in each of the photoelectric conversion elements can be approximated to the exposure time TE that has been set. The right graph of FIG. 4 shows the actual exposure time TA(L) in each of the photoelectric conversion elements. In the right graph of FIG. 4, the horizontal axis represents time, and the vertical axis represents the line number L. As shown in the right graph of FIG. 4, by performing the rolling shutter operation, the actual exposure time TA(L)={Y(L)−X(L)} for each of the photoelectric conversion elements can be approximated to the exposure time TE that has been set. Therefore, as shown by hatching in the right graph of FIG. 4, the error between the actual exposure time TA(L) and the exposure time TE that has been set can be made smaller than that in the instance in which the non-reliant operation is performed, and the error in the exposure amount, which is caused by the error described above, can be made smaller. In an instance in which the reliant operation is performed, the timing X(L) corresponds to a first exposure-start timing. Also, the second exposure-start timing, which is a linear timing X(L) for an instance in which the electronic shutter is caused to perform the non-reliant operation, has a lower degree of reliance on the parabolic timing Y(L) for the mechanical shutter 13 than that of the broken-line shaped timing X(L) for an instance in which the electronic shutter is caused to perform the reliant operation. In the present embodiment, the degree of reliance can be identified from the error between the actual exposure time TA(L) and the exposure time TE that has been set, and can be quantified by, e.g., an inverse of the area of the hatching shown in the right graphs of FIG. 3 and FIG. 4. Specifically, a smaller area of the hatching shown in the right graphs of FIG. 3 and FIG. 4 signifies a higher degree of reliance of the exposure-start timing in relation to the exposure-end timing (3) First Modification Example As shown in the right graph of FIG. 4, it is difficult to completely eliminate the error indicated by the hatching, even in an instance in which the electronic shutter performs the reliant operation. This is because in order to cause the timing X (broken line) at which the electronic shutter starts exposure to be completely reliant on the timing Y(L) for the mechanical shutter 13 (which is expressed as a parabola, but strictly speaking, is different from a parabola), the timing X must be controlled in a complex manner, and the load of controlling the electronic shutter will increase. Also, in the previous embodiment, the boundary B between the exposure region R1 and the light-shielded region R2 is assumed to move while remaining parallel to the direction of each of the lines. However, in an instance in which the boundary B intersects each of the lines, there will be discrepancies in the exposure time between the photoelectric conversion elements in each of the lines. Therefore, even in an instance in which the electronic shutter performs the reliant operation, it is preferable to perform a correction for minimizing any discrepancies in the exposure amount caused by the discrepancies in the exposure time.

Figure 5A:
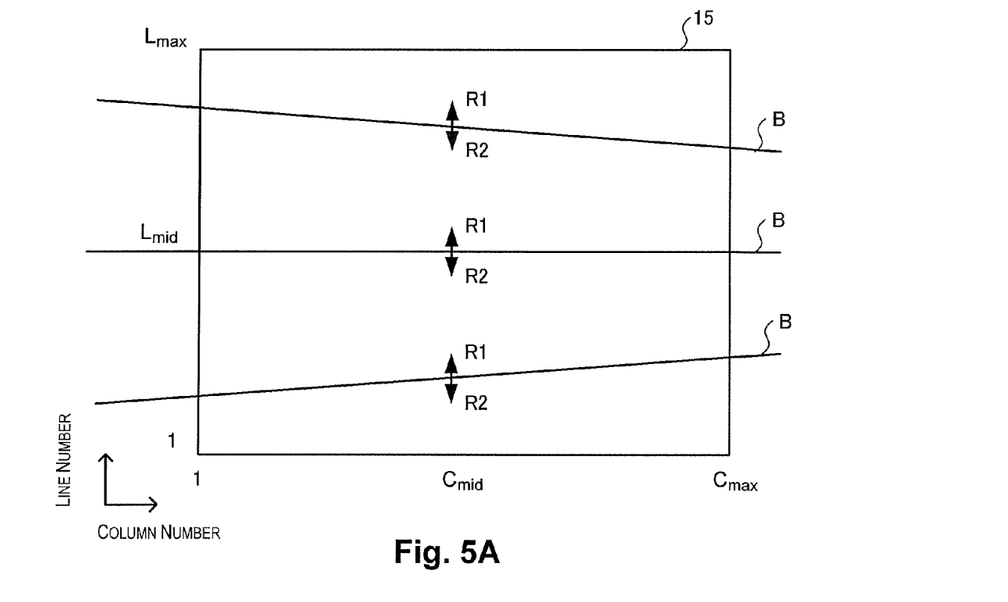
FIG. 5 is a schematic diagram of an area image sensor and a graph showing exposure timings.

FIG. 5A is a schematic diagram showing the entire element surface of the area image sensor 15 in the present modification example as seen from the front. In the mechanical shutter 13 of the present embodiment, the light-shielding screen is supported so as to be capable of a rotating movement about a rotation axis (not shown) provided to the right of the element surface of the area image sensor 15. In the present embodiment, the boundary B and the lines are parallel when the boundary B reaches a line at the center in the orthogonal direction. Until the boundary B reaches the line at the center in the orthogonal direction, the boundary B is tilted so that the right side is higher, and gradually becomes more parallel to the lines. Once the boundary B arrives at the line at the center in the orthogonal direction, the angle of the tilt of the boundary B gradually increases so that the right side is lower. Specifically, the orientation of the boundary B on the element surface of the area image sensor 15 is not constant; and, as a rule, the boundary B intersects the lines. If the rotation axis of the light-shielding screen is provided at a position that is sufficiently distant from the element surface of the area image sensor 15, the boundary B can be regarded as being parallel to each of the lines. However, in the present modification example, the rotation axis of the light-shielding screen is provided at a position at which the boundary B can intersect the lines, as a result of demands placed by, e.g., reducing the size of the image-capturing device 1 or increasing the speed of operation of the mechanical shutter 13.

Figure 5B:
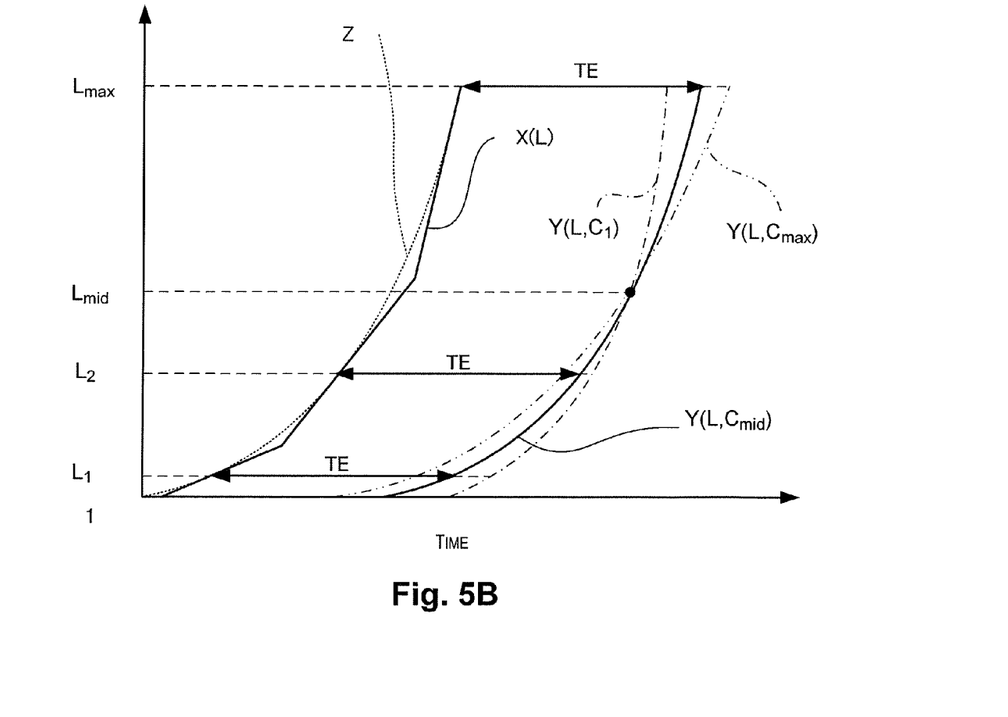

FIG. 5B is a graph showing exposure timings in the photoelectric conversion elements belonging to each of the columns of the area image sensor 15. In this drawing, the timing $Y(L, C_{mid})$ at which exposure ends in each of the photoelectric conversion elements belonging to the column at the center in the horizontal direction is shown by a solid line, and the timings $Y(L, C1)$, $Y(L, C_{max})$ at which exposure ends in each of the photoelectric conversion elements belonging to a column at the left end and the right end respectively is shown by a long dashed short dashed line and a long dashed double-short dashed line respectively. In the present modification example, the timing Y at which exposure in each of the photoelectric conversion elements ends is also dependent on the column number C. Therefore, the timing Y is a function of the line number L and the column number C. In the present modification example, the timing $X(L)$ of the electronic shutter in an instance in which the reliant operation is performed is a three-stage broken line that is reliant on the timing $Y(L, C_{mid})$ for the column at the center in the horizontal direction, which shows an average tendency of the timing at which exposure is ended. Since resetting of the electrical charge in photoelectric conversion elements is performed simultaneously in units of lines, in the present modification example, the timing X for the electronic shutter is again a function of the line number L only. As shown in FIG. 5A, the boundary B between the exposure region R1 and the light-shielded region R2 moves while changing orientation. Therefore, the timing $Y(L, C)$ varies between each column number C. Specifically, until the boundary B reaches the line at the center in the orthogonal direction (line number $L_{mid}$), the boundary B is tilted so that the right side is higher, and exposure therefore ends earlier in photoelectric conversion elements that are nearer the right end. Therefore, until the boundary B reaches the line at the center in the orthogonal direction, the timing Y $(L, C_{max})$ precedes the timing $Y(L, C_{mid})$, and the timing $Y(L, C_{mid})$ precedes the timing $Y(L, C1)$. Meanwhile, after the boundary B has reached the line at the center in the orthogonal direction, the boundary B is tilted so that the right side is lower, and exposure therefore ends earlier in photoelectric conversion elements that are nearer the left end. Therefore, until the boundary B reaches the line at the center in the orthogonal direction, the timing Y $(L, C_{max})$ precedes the timing $Y(L, C_{mid})$, and the timing $Y(L, C_{mid})$ precedes the timing $Y(L, C1)$. Exposure of all photoelectric conversion elements belonging to the line at the center in the orthogonal direction (line number $L_{mid}$) ends simultaneously, and the timings $Y(L_{mid}, C1)$, $Y(L_{mid}, C_{mid})$, and $Y(L_{mid}, C_{max})$ match.

Thus, the timings $Y(L, C1)$, $Y(L, C_{mid})$, and $Y(L, C_{max})$ at which exposure ends vary between each other, depending on the position of the photoelectric conversion elements in the horizontal direction. In contrast, exposure is started in photoelectric conversion elements belonging to every column at timing $X(L)$, which is reliant on the timing $Y(L, C_{mid})$ for the photoelectric conversion elements belonging to the photoelectric conversion elements in the column at the center in the horizontal direction. Therefore, there will be greater discrepancies in the actual exposure time $TA(L, C1)$, $AE(L, C_{max})$ for the photoelectric conversion elements belonging to columns other than the column at the center in the horizontal direction than in the actual exposure time $TA(L, C_{mid})$ for the photoelectric conversion elements belonging to the column at the center in the horizontal direction. Due to restrictions relating to wiring in order to reset the electrical charge at a high speed, the timing at which exposure is started cannot be controlled between each of the columns. Specifically, as long as the boundary B intersects the lines, discrepancies in the exposure time, which is dependent on the position of the photoelectric conversion elements in the horizontal direction, cannot be prevented through any adjustment of the timing X at which exposure is started by the reliant operation of the electronic shutter.

In order to minimize the discrepancy in the amount of exposure, caused by the discrepancy in the exposure time as described above, the image-data-generating part 20 according to the present modification example is provided with an exposure amount correction part. The exposure amount correction part references a look-up table (LUT) recorded in the ROM 53 and corrects, for each pixel, the gradation value of the exposure amount in the image pickup data before the pixel interpolation part 20a performs pixel interpolation. The LUT is data that defines the gain $GE(L, C)$ by which the exposure amount is to be multiplied with regards to each of the photoelectric conversion elements provided to the area image sensor 15, i.e., a corrective amount; and is prepared in advance for each of the exposure time TE to be set. The exposure amount correction part obtains the exposure time that has been set when the image is captured, and references the LUT corresponding to the exposure time. Since each of the pixels in the image pickup data and each of the photoelectric conversion elements of the area image sensor 15 uniquely correspond, the exposure amount correction part can specify the gain for the exposure amount by which multiplication is to be performed for each of the pixels. In the present modification example, the gain $GE(L, C)$ is set as follows, whereby the discrepancies in the exposure amount caused by the discrepancies in the exposure time is minimized.

In the present modification example, a computer for creating the LUT predicts the motion of the light-shielding screen, predicts the progress of the boundary B between the exposure region R1 and the light-shielded region R2 on the element surface from a prediction of the positions of the light beam of the captured light, and thereby calculates the actual exposure time $TA(L, C) = \{Y(L, C) - Y(L)\}$ in relation to all of the photoelectric conversion elements. The exposure time TE that has been set is then divided by the actual exposure time $TA(L, C)$, whereby the gain $GE(L, C)$ is calculated. Alternatively, a subject having uniform brightness is captured, whereby an electrical charge that has accumulated in proportion to the actual exposure amount is obtained in relation to all of the photoelectric conversion elements. Then, the amount of electrical charge in a photoelectric conversion element whose exposure time $TA(L, C)$ is known is divided by the amount of electrical charge of a photoelectric conversion element whose exposure time $TA(L, C)$ is unknown, where the gain $GE(L, C)$ is calculated. Although FIG. 5B shows the timing Y for photoelectric conversion elements belonging to the left edge, the center, and the right edge in the horizontal direction, the timing Y is predicted for photoelectric conversion elements belonging to all columns, and the gain GE is calculated. A gain GE is then made to correspond to each of the photoelectric conversion elements and stored in the LUT.

There is no need to design the operation of the electronic shutter so that the actual exposure time TA(L, C) with regards to all pixels is less than the exposure time TE that has been set. In relation to photoelectric conversion elements whose actual exposure time TA(L, C) is less than the exposure time TE that has been set, the gain GE(L, C) is to be greater than 1. In contrast, in relation to photoelectric conversion elements whose actual exposure time TA(L, C) is greater than the exposure time TE that has been set, the gain GE(L, C) is to be less than 1. However, the operation of the electronic shutter is preferably designed so that the value of gain GE is always a value that is equal to or greater than 1. Having the value of gain GE equal to or greater than 1 makes it possible to minimize any unevenness in light intensity or unevenness in color generated as a result of the maximum saturation value of the exposure amount after correction, in relation to pixels whose exposure amount has been saturated before correction, being lower than a constant value. Also, the value of the gain GE(L, C) deviates from 1 by a greater amount with increasing absolute value of the error between the actual exposure time TA(L, C) and the exposure time TE that has been set. Multiplying the gain GE set as described above with the gradation value of the exposure amount makes it possible to increase the exposure amount for photoelectric conversion elements whose actual exposure time TA(L, C) is shorter, reduce the exposure amount for photoelectric conversion elements whose actual exposure time TA(L, C) is longer, and minimize the effect of discrepancies in the exposure time in relation to the exposure amount. Specifically, since the gain GE can be defined for each pixel, i.e., for each photoelectric conversion element, the gain GE(L, C) can be used to minimize the effect of discrepancies in exposure time, which is generated in a manner that is dependent on both the position in the orthogonal direction and the position in the horizontal direction of each of the photoelectric conversion elements. In particular, although the discrepancies in the exposure time in the horizontal direction, generated by the boundary B between the exposure region R1 and the light-shielded region R2 intersecting the lines, cannot be eliminated even in an instance in which the timing X for the electronic shutter is made to be completely reliant on the timing Y(L, $C_{mid}$) for the mechanical shutter 13, performing a correction using gain GE(L, C) makes it possible to minimize the effect of discrepancies in the exposure time in the horizontal direction. In the present modification example, correction is performed through multiplication of the gain GE on an assumption that the exposure time and the exposure amount are in a proportional relationship with respect to each other. However, in an instance in which non-linearity between the exposure time and the exposure amount is to be taken into consideration, correction of the exposure amount can also be performed after performing a non-linear conversion on the gain GE. The correction based on the gain GE(L, C) can also be performed in an instance in which the non-reliant operation is performed.

(4) Second Modification Example

Although a greater degree of reliance of the first exposure-start timing in relation to the exposure-end timing results in better uniformity in the exposure time, a greater degree of reliance increases the necessary processing capacity. A different configuration can be used for the first exposure-start timing and the second exposure-start timing in relation to the previous embodiments with regards to this limit. For example, the first exposure-start timing can be defined by a curve Z, which is obtained by simply offsetting the timing Y(L) for the mechanical shutter 13, where the second exposure-start timing is defined by a three-stage broken line that is tangential to the curve Z or approximates the curve Z. The first exposure-start timing can also be defined by m-stage broken line (where m is an integer equal to or greater than 3) that are tangential to the curve Z, which is obtained by off-setting the timing Y(L) for the mechanical shutter 13, where the second exposure-start timing is defined by a k-stage broken line (where k is an integer equal to or greater than 2 and less than m) that is tangential to the curve Z. In such instances, the first exposure-start timing has a smaller degree of reliance to the timing Y(L) for the mechanical shutter 13 than that of the second exposure-start timing. Also, the second exposure-start timing can be defined by a curve that approximates the curve Z, without using any broken lines. This curve can be, e.g., a curve of the $n^{th}$ degree (where n is an integer equal to or greater than 1), whose degree of reliance increases as n increases.

(5) Third Modification Example

The discrepancies in the exposure time decrease with increasing length of the exposure time TE that has been set. Therefore, if there are a plurality of threshold values THi (where 0<TH1<TH2< . . . ), and the exposure time TEi that has been set is such that THi≤TE<THi+1, the number of stages of a broken line representing the second exposure-start timing for an instance of TEi can be set so as to be greater than the number of stages of a broken line representing the second exposure-start timing for an instance of TEi+1, or otherwise start exposure in a manner that is less reliant on the timing Y(L) for the mechanical shutter 13 in an instance in which the exposure time is longer. Specifically, in an instance in which the exposure time TE is less than a maximum threshold value $TH_{max}$, the degree of reliance of the first exposure timing on the timing Y(L) for the mechanical shutter 13 can be reduced in correspondence with an increase in the degree to which the exposure time TE approximates the maximum threshold value $TH_{max}$. Also, in an instance in which the exposure time TE that has been set is equal to or greater than the maximum threshold value $TH_{max}$, a reliant operation (rolling shutter operation) with a small number of stages in the broken line can also be performed instead of the non-reliant operation (global shutter operation). A curve can also be used in such an instance instead of the broken line. Specific modes of the invention are not limited to the above embodiment or modification examples; they can represent a combination of the embodiment or the modification examples, and can be modified provided that no departure is made from the technical concept of the invention. The entire disclosure of Japanese Patent Application No. 2010-254579, filed Nov. 15, 2010 is incorporated by reference herein.

General Interpretation of Terms

In understanding the scope of the invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the invention, it will be apparent to those skilled in the art from this disclosure that various changes and modifications can be made herein without departing from the scope of the invention as defined in the appended claims. Furthermore, the foregoing descriptions of the embodiments according to the invention are provided for illustration only, and not for the purpose of limiting the invention as defined by the appended claims and their equivalents.

What is claimed is:

1. An image-capturing device, comprising
an electronic shutter control part being configured to control an electronic shutter and to start exposing first and second photoelectric conversion elements and accumulating electrical charge on the first and second photoelectric conversion elements on the basis of the light;
a mechanical shutter having a light-shielding part which is configured to be able to shield the first and second photoelectric conversion elements from the light, the mechanical shutter being configured to end exposing the first and second photoelectric conversion elements by moving the light-shielding part; and
an assessing part being configured to assess whether a ratio of an error period relative to an exposure time is greater or less than a threshold value, the error period being a period between a first timing of ending exposing the first photoelectric conversion element and a second timing of ending exposing the second photoelectric conversion element, the first photoelectric conversion element being disposed at a first end in a direction in which the light-shielding part moves, the second photoelectric conversion element being disposed at a second end in the direction in which the light-shielding part moves, the second end being an opposite end to the first end,
the electronic shutter control part being configured to control the electronic shutter to start exposing the first photoelectric conversion element at a first exposure-start timing and control the electronic shutter to start exposing the second photoelectric conversion element at a second exposure-start timing in order to make a first exposure time of the first photoelectric conversion elements to be closer to a second exposure time of the second photoelectric conversion element when the ratio of the error period relative to the exposure time is greater than the threshold value, than when the ratio of the error period relative to the exposure time is less than the threshold value,
the electronic shutter control part being configured to control the electronic shutter to make the first exposure time of the first photoelectric conversion element to be less close to the second exposure time of the second photoelectric conversion element when the ratio of the error period relative to the exposure time is less than the threshold value, than when the ratio of the error period relative to the exposure time is greater than the threshold value, the second exposure-start timing being different from the first exposure-start timing when the ratio of the error period relative to the exposure time is less than the threshold value.

2. The image-capturing device according to claim 1, wherein
the electronic shutter control part is configured to control the electronic shutter to start simultaneously exposing both the first and second photoelectric conversion elements, when the ratio of the error period relative to the exposure time is less than the threshold value.

3. The image-capturing device according to claim 1, further comprising
a correct part being configured to make a correction for restraining an influence of a difference between the first exposure time and the second exposure time when the first or second exposure time is less than a first threshold value that is set based on the threshold value and the error period.

4. The image-capturing device according to claim 1, wherein
the assessing part is configured to assess whether the length of the exposure time is longer or less than a second threshold value being longer than a first threshold value that is set based on the threshold value and the error period, and
the electronic shutter control part is configured to control the electronic shutter to make the first exposure time to be closer to the second exposure time when the exposure time is less than the second threshold value than when the exposure time is longer than the second threshold value.

5. The image-capturing device according to claim 1, wherein
the ratio is set by an operation of a user.

6. The image-capturing device according to claim 1, wherein
the ratio is set according to at least one of an image-capturing mode and an image-capturing scene.

7. An image-capturing method for capturing an image in an image-capturing device, the method comprising:
starting exposing first and second photoelectric conversion elements and accumulating electrical charge on the first and second photoelectric conversion elements on the basis of the light;
ending exposing the first and second photoelectric conversion elements by moving a light-shielding part;
assessing whether a ratio of an error period relative to an exposure time is greater or less than a threshold value, the error period being a period between a first timing of ending exposing the first photoelectric conversion element and a second timing of ending exposing the second photoelectric conversion element, the first photoelectric conversion element being disposed at a first end in a direction in which the light-shielding part moves, the second photoelectric conversion element being disposed at a second end in the direction in which the light-shielding part moves, the second end being an opposite end to the first end; and
controlling an electronic shutter to start exposing the first photoelectric conversion element at a first exposure-start timing and controlling the electronic shutter to start exposing the second photoelectric conversion element at a second exposure-start timing in order to make a first exposure time of the first photoelectric conversion elements to be closer to a second exposure time of the second photoelectric conversion element when the ratio of the error period relative to the exposure time is greater than the threshold value, than when the ratio of the error period relative to the exposure time is less than the threshold value,
the electronic shutter control part being configured to control the electronic shutter to make the first exposure time of the first photoelectric conversion element to be less close to the second exposure time of the second photoelectric conversion element when the ratio of the error period relative to the exposure time is less than the threshold value, than when the ratio of the error period relative to the exposure time is greater than the threshold value, the second exposure-start timing being different from the first exposure-start timing when the ratio of the error period relative to the exposure time is less than the threshold value.

8. The image-capturing method according to claim 7, wherein
the ratio is set by an operation of a user.

9. The image-capturing method according to claim 7, wherein
the ratio is set according to at least one of an image-capturing mode and an image-capturing scene.

10. A non-transitory computer readable medium storing an image-capturing program, causing an image-capturing device to:
start exposing first and second photoelectric conversion elements and accumulating electrical charge on the first and second photoelectric conversion elements on the basis of the light;
end exposing the first and second photoelectric conversion elements to the light by moving a light-shielding part;
assess whether a ratio of an error period relative to an exposure time is greater or less than a threshold value, the error period being a period between a first timing of ending exposing the first photoelectric conversion element and a second timing of ending exposing the second photoelectric conversion element, the first photoelectric conversion element being disposed at a first end in a direction in which the light-shielding part moves, the second photoelectric conversion element being disposed at a second end in the direction in which the light-shielding part moves, the second end being an opposite end to the first end; and
control an electronic shutter to start exposing the first photoelectric conversion element at a first exposure-start timing and controlling the electronic shutter to start exposing the second photoelectric conversion element at a second exposure-start timing in order to make a first exposure time of the first photoelectric conversion elements to be closer to a second exposure time of the second photoelectric conversion element when the ratio of the error period relative to the exposure time is greater than the threshold value, than when the ratio of the error period relative to the exposure time is less than the threshold value,
the electronic shutter control part being configured to control the electronic shutter to make the first exposure time of the first photoelectric conversion element to be less close to the second exposure time of the second photoelectric conversion element when the ratio of the error period relative to the exposure time is less than the threshold value, than when the ratio of the error period relative to the exposure time is greater than the threshold value, the second exposure-start timing being different from the first exposure-start timing when the ratio of the error period relative to the exposure time is less than the threshold value.

11. The non-transitory computer readable medium according to claim 10, wherein
the ratio is set by an operation of a user.

12. The non-transitory computer readable medium according to claim 10, wherein
the ratio is set according to at least one of an image-capturing mode and an image-capturing scene.

13. An image-capturing device, comprising
an electronic shutter control part being configured to control an electronic shutter and to start exposing first and second photoelectric conversion elements and accumulating electrical charge on the first and second photoelectric conversion elements on the basis of the light;
a mechanical shutter having a light-shielding part which is configured to be able to shield the first and second photoelectric conversion elements from the light, the mechanical shutter being configured to end exposing the first and second photoelectric conversion elements by moving the light-shielding part; and
an assessing part being configured to assess whether a ratio of an error period relative to an exposure time is greater or less than a threshold value, the error period between a first timing of ending exposing the first photoelectric conversion element and a second timing of ending exposing the second photoelectric conversion element, the first photoelectric conversion element being disposed at a first end in a direction in which the light-shielding part moves, the second photoelectric conversion element being disposed at a second end in the direction in which the light-shielding part moves, the second end being an opposite end to the first end,
the electronic shutter control part being configured to control the electronic shutter to start exposing the first photoelectric conversion element at a first exposure-start timing and control the electronic shutter to start exposing the second photoelectric conversion element at a second exposure-start timing in order to make a first exposure time of the first photoelectric conversion elements to be closer to a second exposure time of the second photoelectric conversion element when the ratio of the error period relative to the exposure time is greater than the threshold value, than when the ratio of the error period relative to the exposure time is less than the threshold value.

14. The image-capturing device according to claim 13, wherein
the ratio is set by an operation of a user.

15. The image-capturing device according to claim 13, wherein
the ratio is set according to at least one of an image-capturing mode and an image-capturing scene.

* * * * *